July 10, 1928.  
O. WITTEL  
SPRING MOTOR  
Filed May 13, 1926
1,676,596
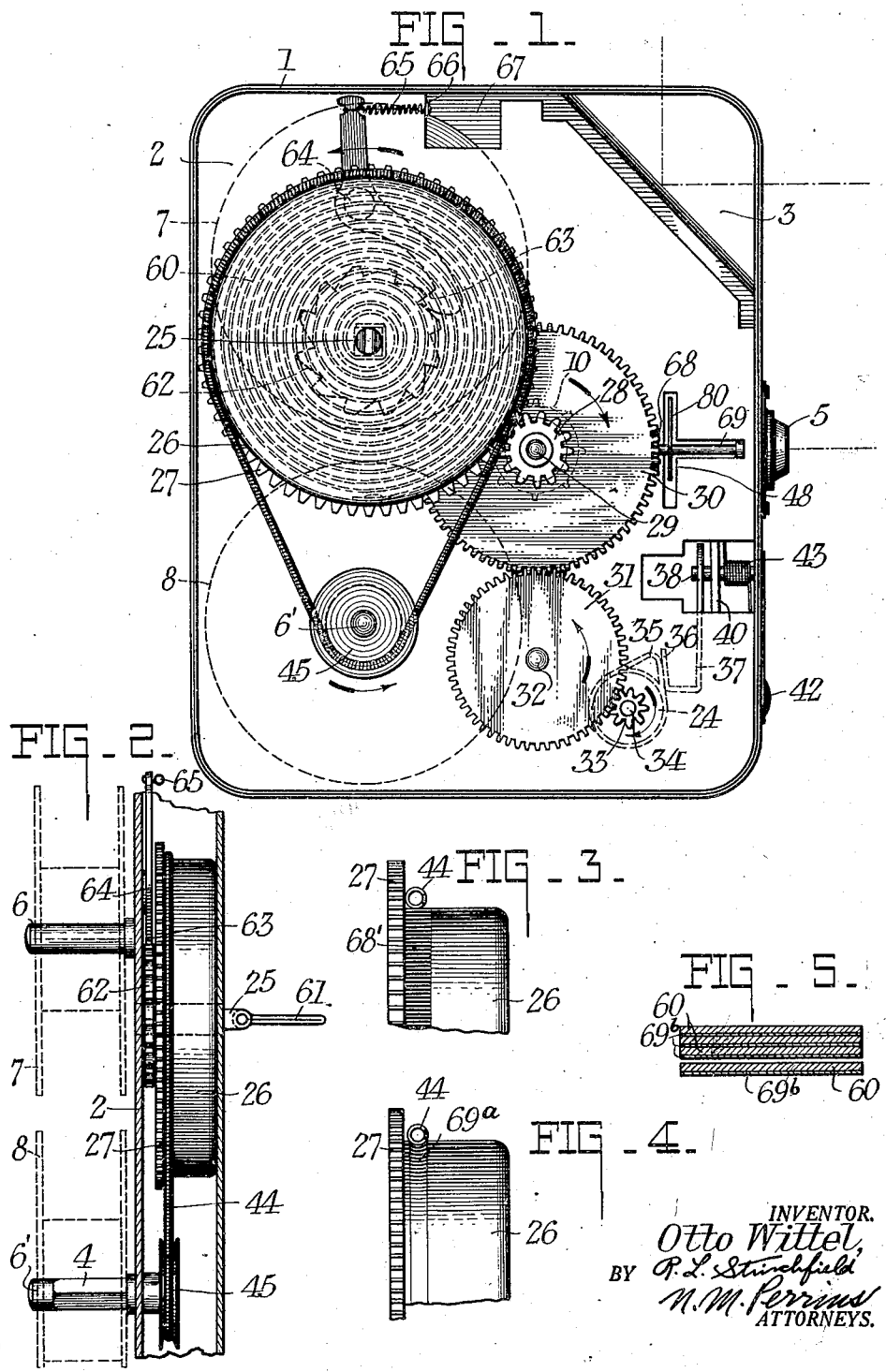
INVENTOR.  
Otto Wittel,  
BY P. L. Stinchfield  
N. M. Perrins  
ATTORNEYS.

Patented July 10, 1928.

1,676,596

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

SPRING MOTOR.

Application filed May 13, 1926. Serial No. 108,797.

This invention relates to spring motors and more particularly to motors for use in small portable motion picture cameras, where compactness of parts and smooth running under all conditions are particularly desirable.

These objects are attained by mounting the spring in a rotatable casing, driven by the spring, and using the casing both as a gear drive and a belt drive, thus securing the utmost economy of space, and also interwinding with the coiled spring an anti-friction band, preferably glued thereto, preventing contact between adjacent coils of metal.

The improvements are more particularly described in the following specification and pointed out in the claims attached thereto.

Reference will now be made to the accompanying drawing wherein the same reference characters denote the same parts in all figures:

Fig. 1 is a view of one side of a motion picture camera with the side of the casing removed.

Fig. 2 is a fragmentary section showing the relation of the motor to certain associated parts.

Fig. 3 is a fragmentary view of part of the motor casing.

Fig. 4 is a fragmentary view of part of a modified motor casing.

Fig. 5 is a section, on an enlarged scale, through several convolutions of the spring and the material interwound therewith.

The mechanism chosen to illustrate an application of my invention is a portable motion picture camera which is disclosed in my copending application, Serial No. 88,791, filed February 17, 1926, and which embodies the inventions herein claimed.

The camera comprises a casing 1, within which is a longitudinal partition 2, carrying most of the parts shown. A finder casing 3, and objective mount 5 are shown. Carried by the partition are reel shafts 6 and 6', the reels 7 and 8 being indicated in dotted lines. The lower shaft 6' has a square portion 4 to engage a similarly shaped aperture in the reel flange so as to drive it. Shaft 6' extends through partition 2 and carries a pulley 45.

Mounted on the rear side of partition 2 is a motor and gear mechanism by which the camera is operated. The spring motor comprises a coiled spring 60, connected at one end to shaft 25, which is rotatably mounted on partition 2 and adapted to be turned in one direction by handle 61, and to be held against turning in the reverse direction by ratchet 62 mounted thereon and pawl 63 pivoted at 64 to frame 2 and resiliently held in engagement with ratchet 62 by spring 65, attached to lug 66, struck up from the aperture 67 in frame 2.

The outer end of the coiled motor spring 60 is attached to the casing 26, which is rotatable about shaft 25, and carries the main driving gear 27, which intermeshes with a gear 28 on the shaft 29 of the film sprocket 10. Carried by shaft 29 is a gear 30, meshing with gear 31 on shaft 32, this gear meshing with a pinion 33 on shaft 34, which carries disc 24, which drives the pull-down claw (not shown). This disc has an extension 35, which may be engaged by a spring stop member 36, carried by arm 37, mounted on a shaft 38, mounted to oscillate in bearings in the supporting lug 40 and the front of the casing and carrying on its outer end a finger piece 42, and held in operative position by spring 43.

The circular rotatable motor casing 26 acts as a seat or driving pulley for the friction belt 44, such as a coiled wire belt, which also passes around pulley 45 and drives the take up reel 8. This is shown in Fig. 2 as being smooth, but may have a knurled or roughened portion 68', as shown in Fig. 3, or a groove 69ª as shown in Fig. 4.

Sprocket 10, disc 24, and stop 36, are indicated in dotted lines being on the other side of the frame 2.

Gear 30 also engages a pinion 68 on shaft 69 which carries shutter 80, the blades of which pass through aperture 48 in the casing.

An important feature of the spring motor is the means adopted for insuring that it shall run smoothly and without jumping This is accomplished by interwinding with the coiled spring 60 an anti-friction band 69ᵇ, which may be merely a strip of paper or smooth cloth, but preferably is a strip of paper cemented or glued securely to the spring throughout the length of the latter. After application, the outer or uncemented surface of the paper or fabric may be rubbed with a lubricant, preferably not a liquid, such as dry graphite. Such springs are usually lubricated by filling the spring casing with a lubricating liquid such as graphite grease, which frequently leaks out and which eventually dries up, whereupon jumping of the spring occurs. The packing and repacking of the spring casing is a very messy job. Moreover, the viscosity of the grease changes with age and with varying temperatures.

By interwinding with an anti-friction material, a steel spring surface is kept from contact with another metal surface and the spring runs smoothly for an indefinite period. There is no grease to leak or to soil other parts, and the spring drives the mechanism with the speed unaffected by temperature changes or by age.

It is to be understood that modified and equivalent structures are to be considered as within the scope of the appended claims.

Having thus described my invention, what I claim as new and desire to secure by Letters Patent is:

1. In a motion picture camera, a spring motor comprising a continuous coiled spring band and an anti-friction band interwound therewith.

2. In a motion picture camera, a spring motor comprising a single, continuous, coiled, metallic, spring band and an anti-friction band adhesively secured along one surface of said band.

3. In a motion picture camera, a spring motor comprising a single, continuous coiled, metallic, spring band and a strip of anti-friction material adhesively secured to one surface of said band throughout its length and interwound therewith.

4. In a motion picture camera, a spring motor comprising a coiled, metallic, spring band and a strip of paper adhesively secured along one surface of said band and interwound therewith.

5. In a motion picture camera, a spring motor comprising a coiled, metallic spring band and a strip of paper glued to one surface of said band throughout its length and interwound therewith, the outer surface of said paper being coated with a lubricant.

6. In a motion picture camera, a spring motor comprising a shaft, a casing and a coiled, metallic, spring band within the casing and at one end attached to the shaft and at the other end to the casing, the shaft and casing being relatively rotatable, and a long, continuous strip of anti-frictional material interwound with the spring band.

7. In a motion picture camera, a spring motor comprising a shaft, a casing and a coiled, metallic spring band within the casing and at one end attached to the shaft and at the other end to the casing, the shaft and casing being relatively rotatable, a long, continuous strip of paper glued to one surface of the band and interwound therewith and having its outer surface coated with dry graphite.

8. A spring motor comprising a shaft, a circular casing rotatable about the shaft, a coiled, metallic spring band within said casing and attached to one end thereto and at the other end to the shaft, the casing carrying a driving gear, and having also about its periphery a seat adapted to engage and drive a friction driving belt.

9. In combination, a spring motor of the type comprising a coiled metallic spring, a rotatable casing enclosing said spring and driven thereby, a gear rigid with the casing, mechanism including a gear intermeshing with the first named gear and including a pulley, and a frictional driving belt surrounding said pulley and said casing whereby the same rotatable casing acts both as a direct gear drive and as a frictional belt drive.

Signed at Rochester, New York, this 11th day of May, 1926.

OTTO WITTEL.